United States Patent
Shen et al.

(10) Patent No.: US 10,338,754 B2
(45) Date of Patent: Jul. 2, 2019

(54) EDGE-EFFECT MITIGATION FOR CAPACITIVE SENSORS

(71) Applicant: Synaptics Incorporated, San Jose, CA (US)

(72) Inventors: Guozhong Shen, San Jose, CA (US); Ozan Ersan Erdogan, San Jose, CA (US); Shengmin Wen, Phoenix, AZ (US); Brett Dunlap, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 162 days.

(21) Appl. No.: 15/282,494

(22) Filed: Sep. 30, 2016

(65) Prior Publication Data

US 2017/0177113 A1 Jun. 22, 2017

Related U.S. Application Data

(60) Provisional application No. 62/269,411, filed on Dec. 18, 2015.

(51) Int. Cl.
*G06F 3/044* (2006.01)

(52) U.S. Cl.
CPC .... *G06F 3/044* (2013.01); *G06F 2203/04107* (2013.01)

(58) Field of Classification Search
None
See application file for complete search history.

(56) References Cited

U.S. PATENT DOCUMENTS

| 5,274,198 | A  | * | 12/1993 | Landmeier    | G06F 3/041 178/18.08 |
|-----------|----|---|---------|--------------|----------------------|
| 8,716,613 | B2 |   | 5/2014  | Pererselsky et al. |                |
| 2008/0165139 | A1 | * | 7/2008 | Hotelling   | G06F 3/041 345/173  |
| 2009/0085894 | A1 | * | 4/2009 | Gandhi      | G06F 3/041 345/175  |
| 2011/0304001 | A1 |   | 12/2011 | Erhart et al. |                   |

(Continued)

OTHER PUBLICATIONS

U.S. Appl. No. 14/375,018, Shen et al., filed Mar. 31, 2015.

*Primary Examiner* — Stephen T. Reed

(74) *Attorney, Agent, or Firm* — Leydig, Voit & Mayer, Ltd.

(57) ABSTRACT

An input device for capacitive sensing includes: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; a plurality of transmitter electrode vias, wherein each transmitter electrode via corresponds to a respective transmitter electrode of the plurality of transmitter electrodes; and conductive shielding, configured to mitigate effects of the plurality of transmitter electrode vias on the detected signals received on one or more receiver electrodes of the plurality of receiver electrodes, wherein the conductive shielding comprises: a first portion disposed above the plurality of transmitter electrode vias; and a second portion disposed outside the plurality of transmitter electrode vias.

18 Claims, 13 Drawing Sheets

(56) References Cited

U.S. PATENT DOCUMENTS

| | | | |
|---|---|---|---|
| 2011/0314669 A1* | 12/2011 | Stamper | B81C 1/00476 |
| | | | 29/846 |
| 2012/0087065 A1* | 4/2012 | Kim | G06F 1/1656 |
| | | | 361/679.01 |
| 2012/0256280 A1 | 10/2012 | Erhart et al. | |
| 2015/0189799 A1* | 7/2015 | Makelainen | G06F 3/044 |
| | | | 345/174 |
| 2016/0378233 A1* | 12/2016 | Huo | G06F 3/0412 |
| | | | 345/174 |

* cited by examiner

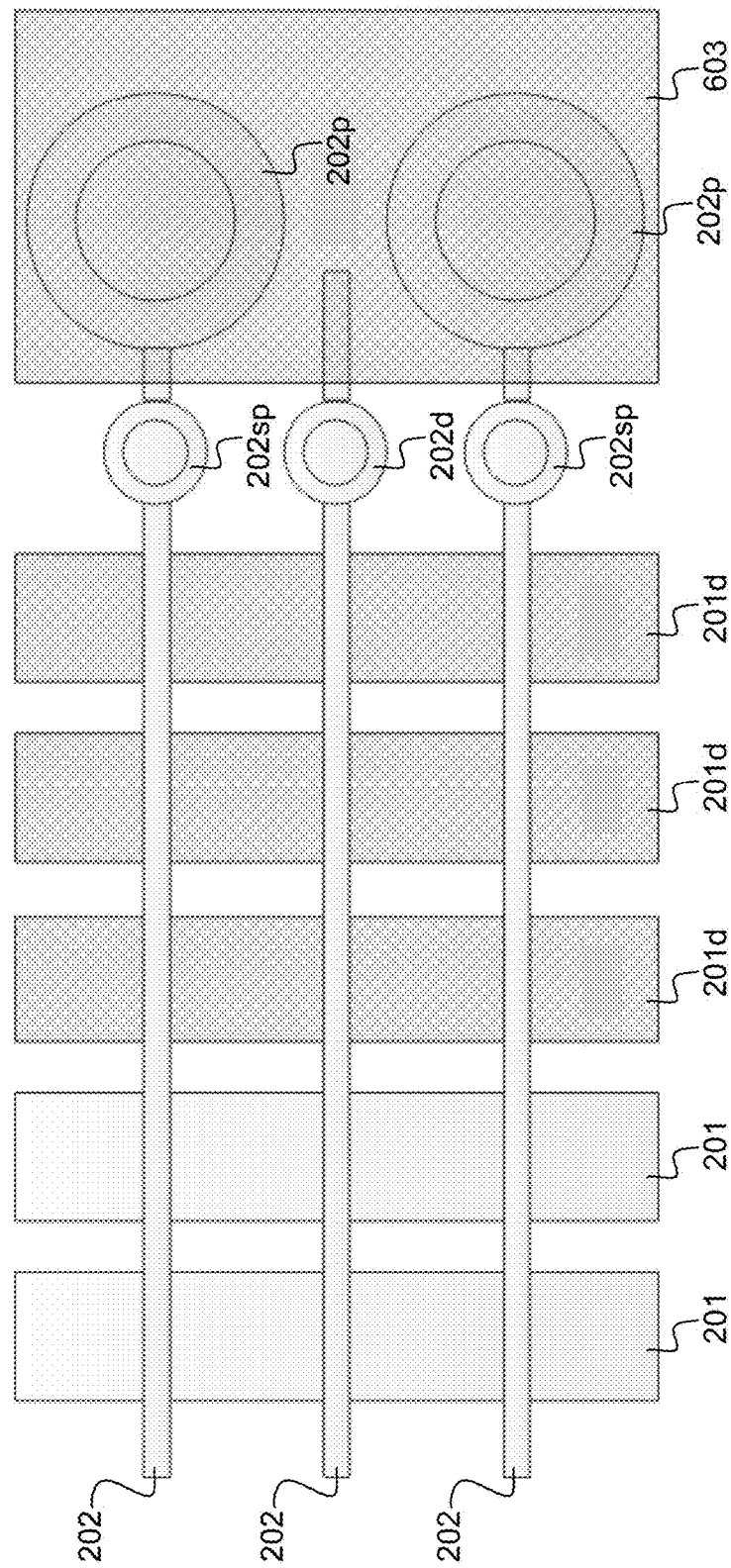

EDGE-EFFECT MITIGATION FOR CAPACITIVE SENSORS

CROSS-REFERENCE TO RELATED APPLICATIONS

This patent application claims the benefit of U.S. Provisional Patent Application No. 62/269,411, filed Dec. 18, 2015, which is incorporated by reference.

BACKGROUND

Input devices, including touch sensor devices (also commonly called touchpads or proximity sensor devices), as well as fingerprint sensor devices, are widely used in a variety of electronic systems.

Touch sensor devices typically include a sensing region, often demarked by a surface, in which the touch sensor device determines the presence, location and/or motion of one or more input objects, typically for purposes allowing a user to provide user input to interact with the electronic system.

Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

SUMMARY

In an exemplary embodiment, an input device for capacitive sensing includes: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; a plurality of transmitter electrode vias, wherein each transmitter electrode via corresponds to a respective transmitter electrode of the plurality of transmitter electrodes; and conductive shielding, configured to mitigate effects of the plurality of transmitter electrode vias on the detected signals received on one or more receiver electrodes of the plurality of receiver electrodes, wherein the conductive shielding comprises: a first portion disposed above the plurality of transmitter electrode vias; and a second portion disposed outside the plurality of transmitter electrode vias.

In another exemplary embodiment, an input device for capacitive sensing includes: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; a first plurality of receiver electrode vias disposed on a first side of the plurality of receiver electrodes, wherein the first plurality of receiver electrode vias correspond to a first subset of the plurality of receiver electrodes; a second plurality of receiver electrode vias disposed on a second side of the plurality of receiver electrodes, wherein the second plurality of receiver electrode vias correspond to a second subset of the plurality of receiver electrodes; balancing metal corresponding to the first subset of the plurality of receiver electrodes disposed on the second side of the plurality of receiver electrodes; and balancing metal corresponding to the second subset of the plurality of receiver electrodes disposed on the first side of the plurality of receiver electrodes; wherein the balancing metal corresponding to the first subset of the plurality of receiver electrodes is configured to balance the detected signals received on the plurality of receiver electrodes proximate to the second side of the plurality of receiver electrodes; and wherein the balancing metal corresponding to the second subset of the plurality of receiver electrodes is configured to balance the detected signals received on the plurality of receiver electrodes proximate to the first side of the plurality of receiver electrodes.

In yet another exemplary embodiment, an input device for capacitive sensing includes: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; a plurality of receiver electrode vias, wherein each receiver electrode via of the plurality of receiver electrode vias corresponds to a respective receiver electrode of the plurality of receiver electrodes; a plurality of receiver electrode step-vias, wherein each receiver electrode step-via of the plurality of receiver electrode step-vias is configured to connect a receiver electrode of the plurality of receiver electrodes to a lower level of the input device; and conductive shielding, configured to mitigate effects of the plurality of receiver electrode vias on the detected signals received on one or more receiver electrodes of the plurality of receiver electrodes, wherein the conductive shielding comprises: a first portion disposed above the plurality of receiver electrode vias; and a second portion disposed outside the plurality of receiver electrode vias.

BRIEF DESCRIPTION OF THE DRAWINGS

FIG. 6A-6B are schematic illustrations of components of a capacitive sensor having Rx electrode step-vias and a conductive shielding with a first portion disposed above Rx electrode vias and a second portion disposed outside the Rx electrodes vias.

DETAILED DESCRIPTION

The following detailed description is exemplary in nature and is not intended to limit the disclosure or the application and uses of the disclosure. Furthermore, there is no intention to be bound by any expressed or implied theory presented in the preceding background and brief description of the drawings, or the following detailed description.

Turning to the drawings, and as described in greater detail herein, embodiments of the disclosure provide methods and systems for capacitive sensing. Among other things, this disclosure describes methods and systems for using conductive structures to mitigate edge-effects in capacitive sensor images. The conductive structures are able to reduce or eliminate the appearance of artifacts at the edge(s) of a captured image.

Figure 1:
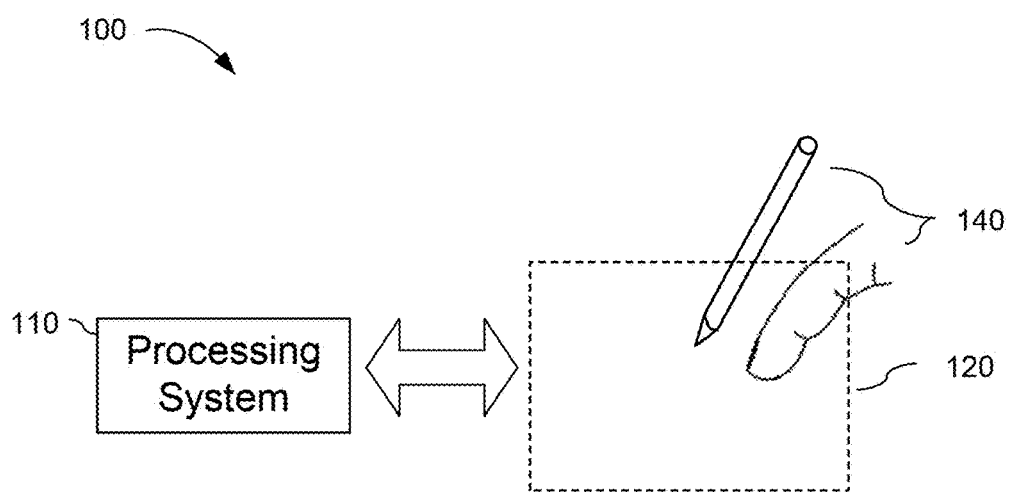
FIG. 1 is a block diagram of an example input device and processing system.

FIG. 1 is a block diagram of an exemplary input device 100 and processing system 110. The input device 100 may be configured to provide input to an electronic system (also "electronic device"). Some non-limiting examples of electronic systems include personal computers of all sizes and shapes, such as desktop computers, laptop computers, netbook computers, tablets, e-book readers, personal digital assistants (PDAs), and wearable computers (such as smart watches and activity tracker devices). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device, and the electronic system could include multiple computers distributed over a telecommunications network.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

As illustrated in FIG. 1, the input device 100 may be configured to sense input provided by one or more input objects 140 in a sensing region 120. Non-limiting examples of the input object 140 include fingers, styli, as illustrated in FIG. 1. By way of example, the input device 100 may be implemented as a proximity sensor (such as a touch pad, touch screen, or other touch sensor), biometric sensor (such as a fingerprint sensor), or a combination thereof.

Sensing region 120 encompasses any space above, around, in, and/or near the input device 100 in which the input device 100 is able to detect input (e.g., user input provided by one or more input objects 140). The sizes, shapes, and locations of particular sensing regions may vary widely in different implementations of the input device 100. In some implementations, the sensing region 120 extends from a surface of the input device 100 in one or more directions into space until signal-to-noise ratios prevent sufficiently accurate object detection. By way of example, the distance to which this sensing region 120 extends in a particular direction may be on the order of less than a millimeter, millimeters, centimeters, or more, and may vary significantly with the type of sensing technology used and the accuracy desired. Further, some implementations sense input that comprises no contact of the input object with any surfaces of the input device 100, input that comprises contact of the input object with an input surface (e.g., a touch surface) of the input device 100, input that comprises contact of the input object with an input surface of the input device 100 coupled with some amount of applied force or pressure, or any combination thereof. The input surface may be provided by a cover layer disposed over sensor elements of the input device. By way of example, the cover layer may be provided by a casing within which sensor elements reside, by a face sheet applied over the sensor elements, by a transparent display cover sheet overlying the sensor elements, and the like.

The input device 100 comprises one or more sensing elements for detecting user input. Some implementations utilize arrays or other regular or irregular patterns of sensing elements to detect the input object 140. The input device 100 may utilize different combinations of sensor components and sensing technologies to detect user input in the sensing region 120.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. In another implementation, an absolute capacitance sensing method operates by modulating a drive ring or other conductive element that is ohmically or capacitively coupled to the input object, and by detecting the resulting capacitive coupling between the sensor electrodes and the input object. The reference voltage may by a substantially constant voltage or a varying voltage and in various embodiments; the reference voltage may be system ground.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some implementations are configured to provide images that span one, two, three, or higher dimensional spaces. The input device may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, the fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, the fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 mm$^2$ or less. In another exemplary embodiment, a partial placement sensor has an imaging area in the range of 20-50 mm$^2$. In some implementations, the partial fingerprint sensor has an input surface that is the same size the imaging area.

In FIG. 1, a processing system 110 is shown in communication with the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. Further, a processing system for a self capacitance sensor device may comprise driver circuitry configured to drive absolute capacitance signals onto sensor electrodes, and/or receiver circuitry configured to receive signals with those sensor electrodes. In one more embodiments, a processing system for a combined mutual and self capacitance sensor device may comprise any combination of the above described mutual and self capacitance circuitry. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a computing device, and the processing system 110 may comprise software configured to run on a central processing unit of the computing device and one or more ICs (perhaps with associated firmware) separate from the central processing unit. As another example, the input device 100 may be physically integrated in a mobile device, and the processing system 110 may comprise circuits and firmware that are part of a main processor of the mobile device. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system 110.

It should be understood that while many embodiments of this disclosure are described in the context of a fully functioning apparatus, certain mechanisms of the present disclosure may be capable of being distributed as a program product (e.g., software) in a variety of forms. For example, these mechanisms may be implemented and distributed as a software program on information bearing media that are readable by electronic processors (e.g., non-transitory computer-readable and/or recordable/writable information bearing media readable by the processing system 110). Additionally, embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
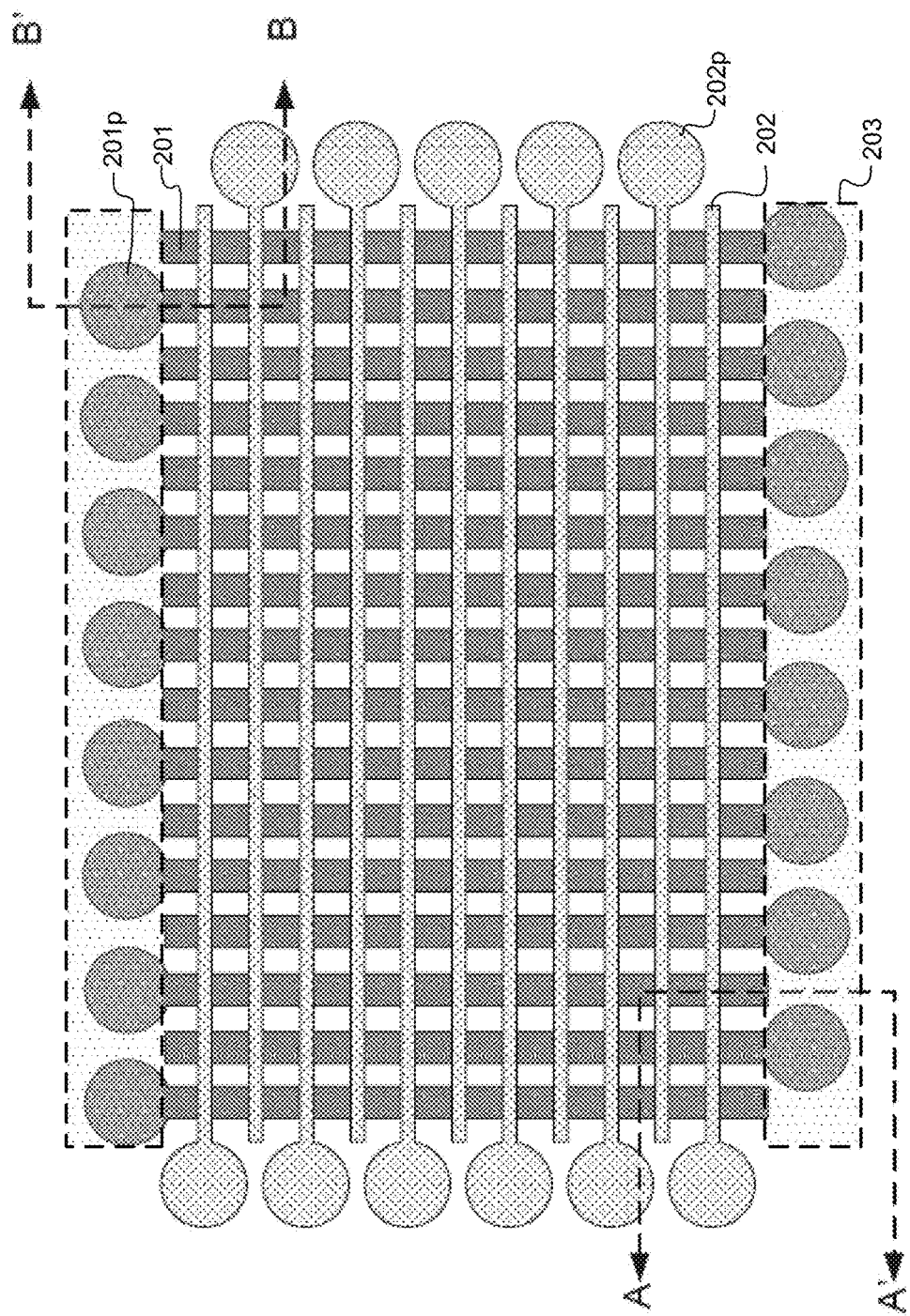
FIGS. 2A-2C are schematic illustrations of certain components of an exemplary capacitive sensor.
Figure 2B:
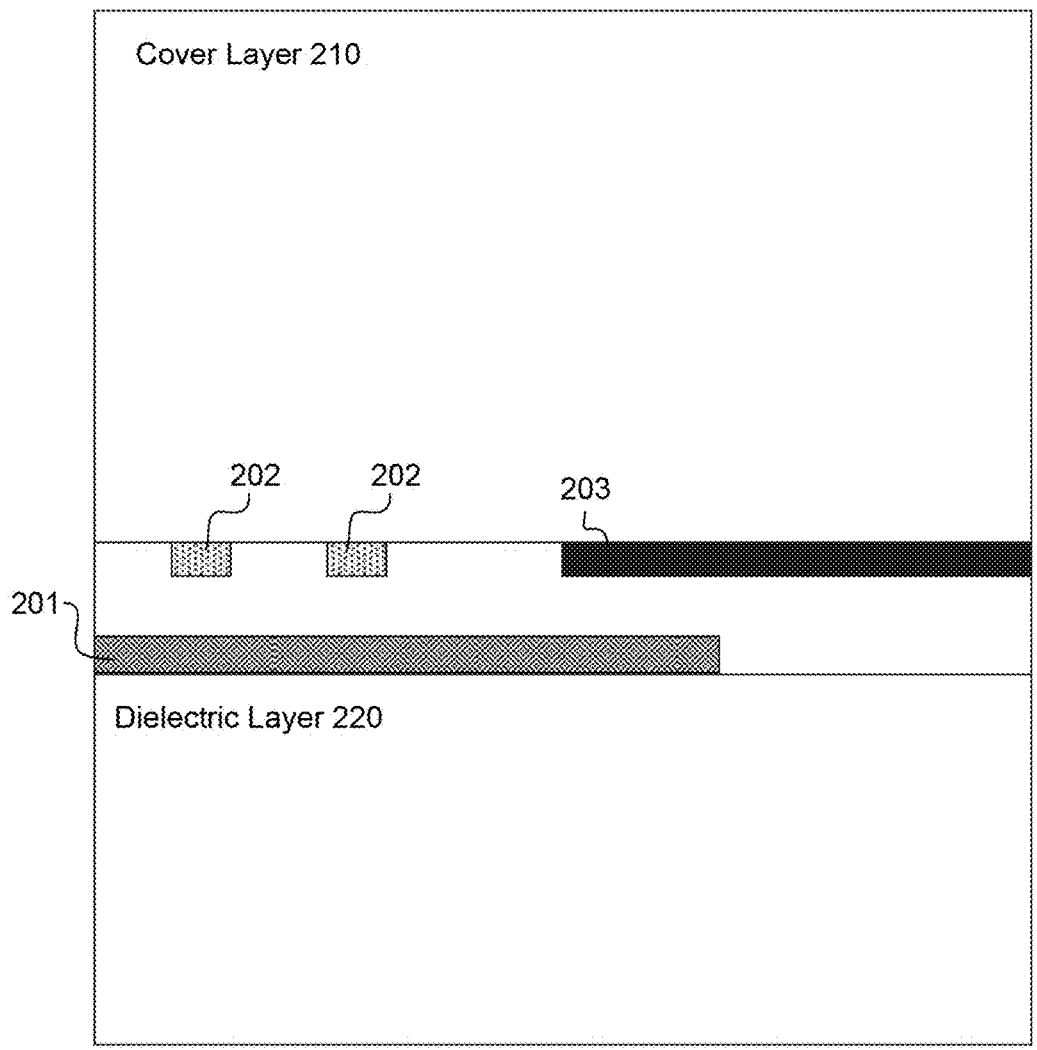
Figure 2C:
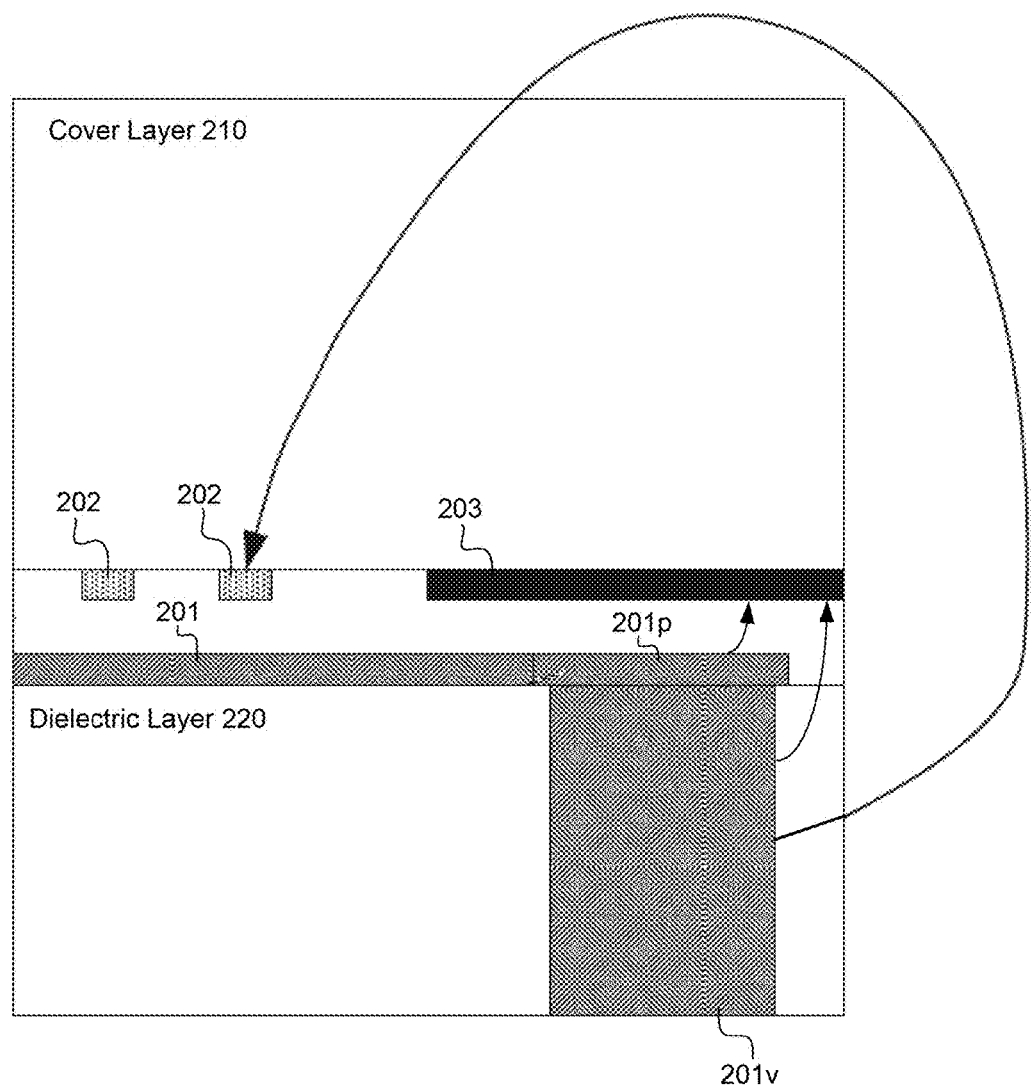

FIGS. 2A-2C are schematic illustrations of certain components of an exemplary capacitive sensor. The capacitive sensor of FIGS. 2A-2C includes a plurality of sensor electrodes arranged in an overlapping grid to from a two-dimensional sensing array. The sensor electrodes include a plurality of transmitter (Tx) electrodes 201, and a plurality of receiver (Rx) electrodes 202 extending in a direction orthogonal to the Tx electrodes 201. An active sensing area is formed in the area corresponding to where the sensor electrodes overlap. Each of the sensor electrodes is routed through one or more inner layers of the sensor using conductive routing at a peripheral portion of the sensor, near an edge of the active sensing area. As shown in FIG. 2A, a via pad 201p, 202p which connects to a via (extending into the page in this illustration) is used at an end of each sensor electrode for routing the sensor electrodes. This routing can connect the sensor electrode pattern to sensor circuitry, e.g., for capturing an image of an input object above the active sensing area. It will be appreciated that although the vias and via pads are depicted in this exemplary embodiment as being round, other geometric configurations for the vias and via pads may be used as well.

The sensor pattern shown in FIG. 2A has a geometry adapted for sensing a fingerprint or other small surface variations. Due to routing constraints, the area used for the via pad and via at the end of each sensor electrode is larger than the space separating adjacent sensor electrodes (e.g., the pitch of the rows and columns of Tx and Rx electrodes). Because of this, the sensor electrodes are routed alternatively from opposite ends. As shown in FIG. 2A, the Rx electrodes are routed with via pads alternatively on the left and right, and similarly, the Tx electrodes are routed with via pads alternatively on the top and bottom. Thus, along a given edge in the sensor pattern depicted in FIG. 2A, every other electrode has a via pad with a via routing to the inner layer(s).

In the sensor pattern shown in FIG. 2A, the Rx electrodes 202 are in an upper layer that is above the layer in which the Tx electrodes 201 are located. A conductive shielding 203 is located above the Tx electrodes 201 in the same layer as the Rx electrodes 202.

FIG. 2B depicts a cross-section along lines A-A' shown in FIG. 2A, which corresponds to an end portion of a Tx electrode 201 that does not terminate in a via, and FIG. 2C depicts a cross-section along lines B-B' shown in FIG. 2A, which corresponds to an end portion of a Tx electrode 201 that terminates in a via. As discussed above, the Rx electrodes 202 are in a same layer as a conductive shielding 203, and the Tx electrodes 201 are in a lower layer. Above the sensor electrodes is a cover layer 210, and below the sensor electrodes is a dielectric layer 220. Further, as shown in FIG. 2C, for a via pad 201p connected to a TX electrode 201, the conductive shielding 203 is above the via pad 201p such that it blocks at least a portion of electric field lines extending from the via pads and vias of the Tx electrodes 201 to the Rx electrodes 202. However, as shown in FIG. 2C, there will be additional electric field lines from the via pad 201p and/or the via 201v corresponding to the Tx electrode 201 that reach one or more Rx electrodes 202 (particularly with respect to Rx electrodes 202 near the edge of the sensing region).

It should be understood that FIGS. 2A-2C are schematic illustrations only, and certain details are omitted for the purposes of explanation. For example, inner layer details of the components located in or below the dielectric layer 220 are omitted in FIGS. 2B-2C.

In certain applications, the sensor electrodes may be separate from an input surface for an input object (e.g., at the top of a cover layer 210) by a significant thickness. For example, layer(s) of material, such as a cover glass layer, an adhesive layer, a color layer, or other layers, which separate the electrodes of the capacitive sensor from the input surface, may have a thickness of 50 μm to 300 μm or up to 400 μm or more. In certain fingerprint sensors, so-called "edge effects" may appear at the edges of an image captured by the sensor electrodes when the thickness of the cover layer is approximately 150 μm or more. With increasing cover thicknesses, the signal detected by the sensor electrodes becomes smaller and smaller (e.g., ~10× reduction per 100 um), which causes the edge effects to become more and more pronounced.

Figure 3:
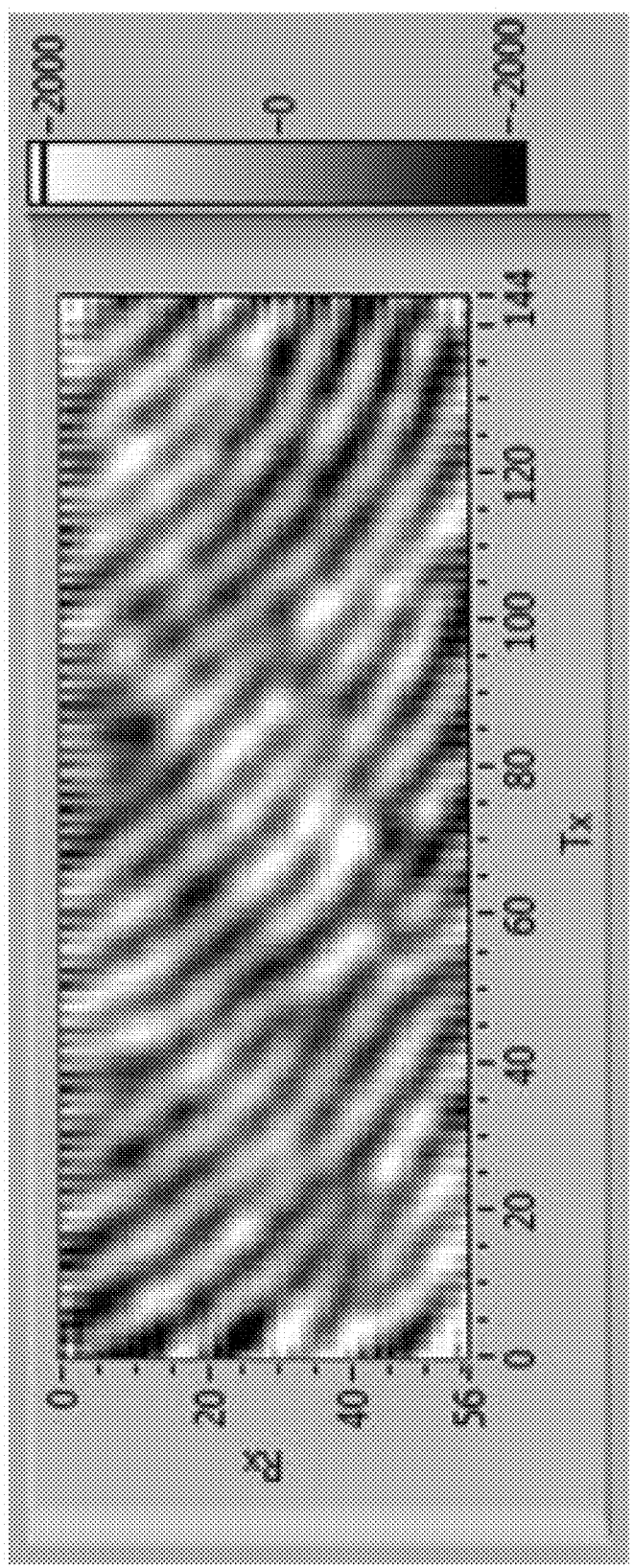
FIG. 3 depicts an example captured image of a fingerprint having edge effects.

FIG. 3 depicts an example captured image of a fingerprint having edge effects. The edge effects can be seen in this image as black/white stripes observed along all four edges. The image in FIG. 3 corresponds to a sensor stack having a cover glass layer with a thickness of 210 μm and a 15 μm thick layer of optically clear adhesive (OCA).

These edge effects are at least in part due to the differences at the edges between adjacent Tx electrodes and between adjacent Rx electrodes. The routing structure, for example, as shown in FIGS. 2A-2C, which has vias for only every other sensor electrode at each edge of the sensing region, causes the electric field lines between even lines to be different than odd lines in each edge of the sensing region, which results in the capacitor delta (dCt) to be different. In capacitive sensors based on a baseline reference level received at the Rx electrodes while the Tx electrodes are driven with no finger is present, the baseline will include stronger electric field readings at edge pixels where vias and via pad are present relative to edge pixels where vias and via pads are not present (e.g., Rx electrodes 202 in FIG. 2B detects less electric field when a finger is not present than Rx electrodes 202 in FIG. 2C). Thus, when a finger is present, and the electric field lines from the vias and/or via pads are blocked (e.g., if a finger is blocking the field line through the cover layer 210 depicted in FIG. 2C), the change in capacitance caused by the finger at edge pixels where vias and via pads are present is significantly greater than the change in capacitance caused by the finger at edge pixels where vias and via pads are not present. This introduces the edge effects seen in FIG. 3, and the effect becomes more pronounced as the distance between the input surface and the sensor electrodes increases.

Embodiments of the present disclosure provide various structures that are able to mitigate and/or eliminate these edge effects while maintaining an optimally large sensing area. These embodiments are further able to achieve edge effect mitigation and/or elimination without increasing the overall thickness of the capacitive sensing structure, which may be particularly valuable, for example, in applications where maintaining a minimal thickness is desirable (e.g., capacitive fingerprint sensors for mobile devices). Further, additional techniques, such as discarding edge pixels and/or adding dummy electrodes at one or more edges of the sensing region, may be utilized in combination with these embodiments of the present disclosure to further mitigate and/or eliminate edge effects.

In a first exemplary embodiment, an input device for capacitive sensing includes: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; a plurality of transmitter electrode vias, wherein each transmitter electrode via corresponds to a respective transmitter electrode of the plurality of transmitter electrodes; and conductive shielding, configured to mitigate effects of the plurality of transmitter electrode vias on the detected signals received on one or more receiver electrodes of the plurality of receiver electrodes, wherein the conductive shielding comprises: a first portion disposed above the plurality of transmitter electrode vias; and a second portion disposed outside the plurality of transmitter electrode vias.

Figure 4:
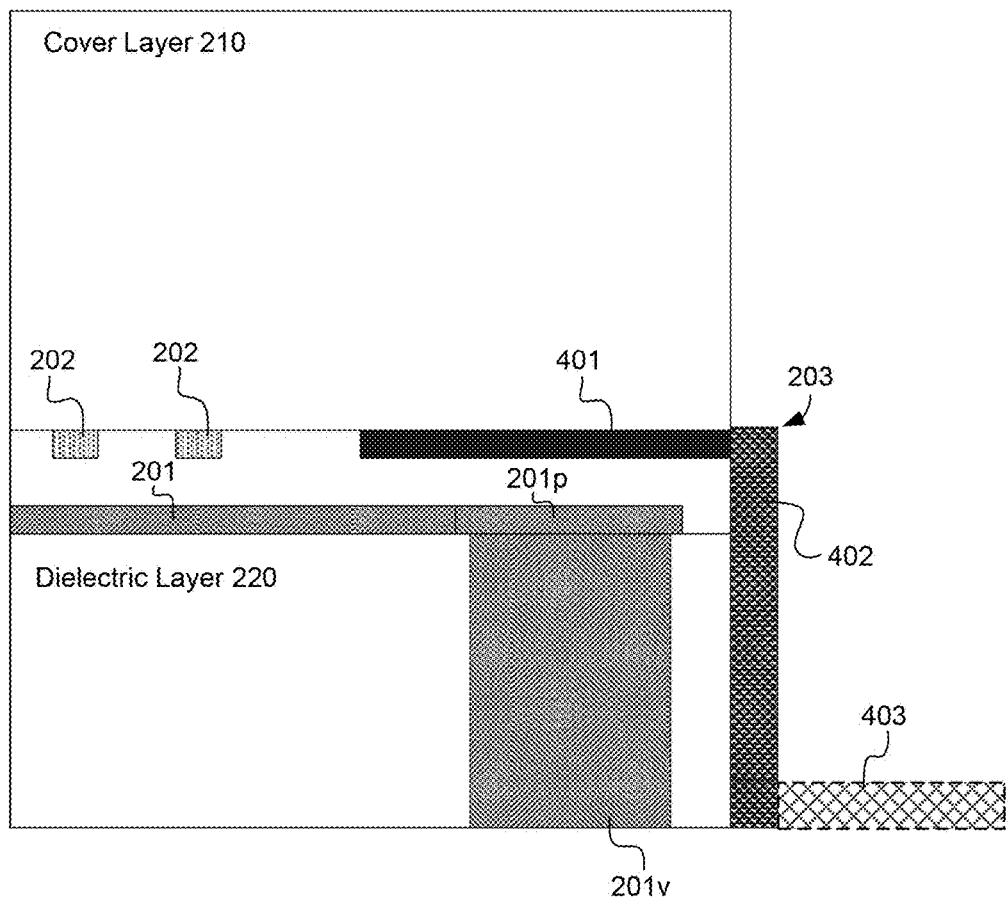
FIG. 4 is a schematic illustration of components of an example capacitive sensor having a conductive shielding with a first portion disposed above Tx electrode vias and a second portion disposed outside the Tx electrodes vias.

FIG. 4 is a schematic illustration of an exemplary implementation of this first exemplary embodiment, depicting components of a capacitive sensor having a conductive shielding with a first portion disposed above Tx electrode vias and a second portion disposed outside the Tx electrodes vias. Similar to FIG. 2C, the capacitive sensor includes a Tx electrode 201 connected to via pad 201 and via 201v, and Rx electrodes 202. The Tx electrode 201 and Rx electrodes 202 are disposed below a cover layer 210 and above a dielectric layer 220 (with inner layer details of the components located in or below the dielectric layer omitted). The capacitive sensor further includes a conductive shielding 203 with a first, horizontal portion 401 disposed above the Tx electrode via 201v and via pad 201p. Additionally, in accordance with this first exemplary embodiment, the conductive shielding of the capacitive sensor further includes a second, vertical portion 402 disposed outside the Tx electrode via 201v.

It will be appreciated that the first portion 401 and the second portion 402 are not required to be horizontal and vertical as depicted, so long as they are disposed above and outside the Tx electrode via to provide shielding that blocks electric field lines such as those shown in FIG. 2C from reaching edge Rx electrodes.

In one exemplary implementation, the second portion 402 may include a conductive wall outside the sensing area formed by the plurality of sensor electrodes. In another exemplary implementation, the second portion 402 may include a plurality of conductive vias disposed outside the plurality of transmitter electrode vias. In another exemplary implementation, the second portion 402 may include a metal bezel surrounding the sensing area (e.g., having a structure similar to a sputtering shield, or a metal piece having a window for the sensing area). In another exemplary implementation, the second portion 402 may include conductive ink. The second portion 402 may thus be formed, for example, by plating, sputtering, conductive coating, painting (e.g., with a conductive paint), and/or using an adhesive along the edge of the capacitive sensor, or by forming an additional row of via structures outside the Tx electrode vias. Other structures and techniques for forming the second portion 402 may also be used.

The shielding (which may be a conductive wall, a plurality of conductive vias, a metal bezel, conductive ink or paint, etc.) may be disposed proximate to the Tx electrode vias on the outside edge of a sensor substrate, or within the sensor substrate at a peripheral portion near the outside edge of a sensor substrate.

In an exemplary implementation, the horizontal thickness of the second portion 402 may be 100 µm, but it will be appreciated that the horizontal thickness may vary based on the type of structure and processing techniques used (e.g., the horizontal thickness may be in the hundreds of nanometers range for coating techniques).

In a further exemplary embodiment, the conductive shielding 203 may further include a third portion 403 that extends horizontally from the second portion 402 away from the Tx electrode vias 201. In various exemplary implementations, this horizontally extended third portion 403 may be positioned above the vias and/or outside the vias and/or adjacent to the second portion 402. It will be appreciated that the third portion 403 may be formed in a similar manner and/or have a similar structure as discussed above with respect to the second portion 402 (e.g., the third portion 403 may be a conductive sheet, may be conductive traces connected to conductive vias, may be part of a metal bezel, may be a conductive ink, and may be formed, for example, by plating, sputtering, conductive coating, painting, and/or using an adhesive).

In a further exemplary embodiment, the conductive shielding 203 may be connected to a reference voltage or system ground.

Figure 5:
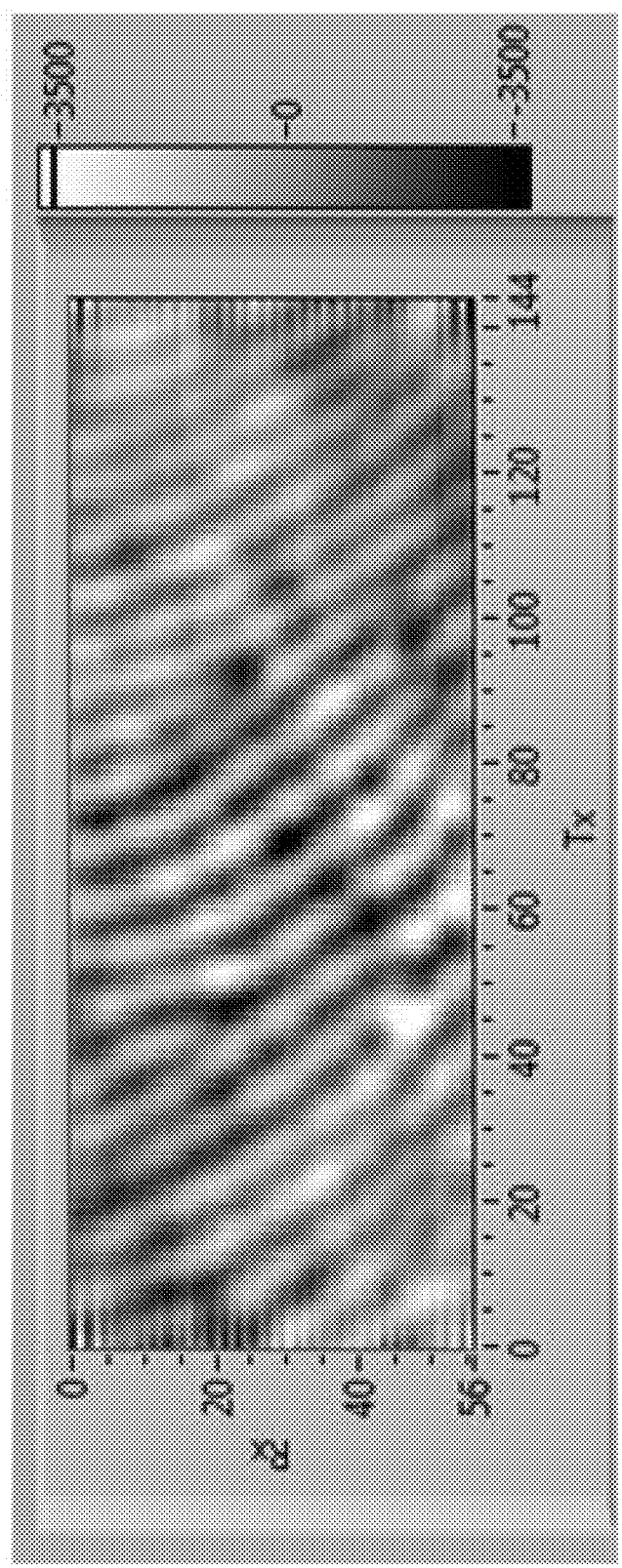
FIG. 5 depicts an example captured image of a fingerprint where edge effects along the top and bottom edges are mitigated by the conductive shielding structure shown in FIG. 4.

The conductive shielding 203 as depicted in FIG. 4 may be disposed all along the top and bottom edges of the capacitive sensor device shown in FIG. 2A, so as to mitigate the edge effects due to the differences between alternating Tx electrodes along those top and bottom edges. FIG. 5 depicts an example captured image of a fingerprint where edge effects along the top and bottom edges are mitigated by the conductive shielding structure shown in FIG. 4. In this particular example, conductive paint was applied along the top and bottom edges to form a second portion of a conductive shielding disposed outside the Tx electrodes of a fingerprint sensor having a cover layer with 210 µm of glass and 30 µm of adhesive. As can be seen in the top and bottom edges of the image corresponding to the edges where Tx electrode vias are located, the edge effects along these top and bottom edges are mitigated or completely removed (see FIG. 3 for comparison).

As can be seen in FIG. 5, the structure discussed above with respect to FIG. 4 is only applied to the top and bottom edges (where conductive shielding 203 is able to be placed above and outside the Tx electrode vias). However, since the Rx electrodes are on the upper layer (see, e.g., FIGS. 2A-2C), the Rx electrode vias and via pads at the right and left edges of the capacitive sensor come up to the top of the capacitive sensor, and a conductive shielding such as the conductive shielding illustrated in FIG. 4 cannot directly be added above and outside the Rx electrode vias without increasing the thickness of the capacitive sensor.

In a second exemplary embodiment, the routing for Rx electrodes at the left and right edges of the sensing area is modified so as to include step vias for connecting the Rx electrodes to the Rx electrode vias, with the Rx electrode vias coming up to a lower layer of the capacitive sensor (e.g., the same layer that the Tx electrode vias come up to). This allows for a relatively uniform electric field to be generated at the left and bottom edges and for conductive shielding to be applied above and outside the alternating Rx electrode vias.

For example, an input device for capacitive sensing according to the second exemplary embodiment may include: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; a plurality of receiver electrode vias, wherein each receiver electrode via of the plurality of receiver electrode vias corresponds to a respective receiver electrode of the plurality of receiver electrodes; a plurality of receiver electrode step-vias, wherein each receiver electrode step-via of the plurality of receiver electrode step-vias is configured to connect a receiver electrode of the plurality of receiver electrodes to a lower level of the input device; and conductive shielding, configured to mitigate effects of the plurality of receiver electrode vias on the detected signals received on one or more receiver electrodes of the plurality of receiver electrodes, wherein the conductive shielding comprises: a first portion disposed above the plurality of receiver electrode vias; and a second portion disposed outside the plurality of receiver electrode vias.

Figure 6B:
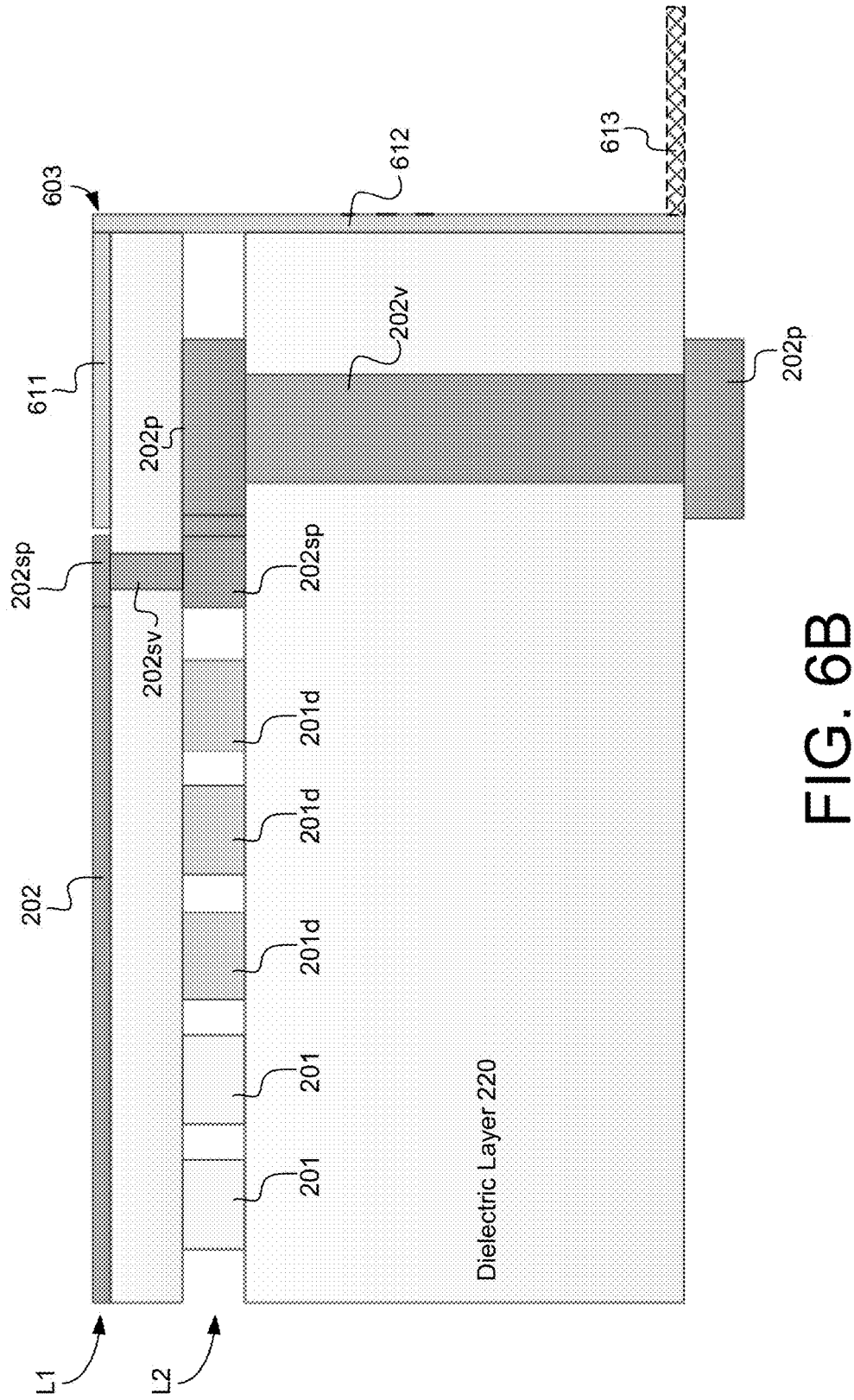

FIGS. 6A-6B are schematic illustrations of an exemplary implementation of this second exemplary embodiment, depicting components of a capacitive sensor having Rx electrode step-vias 202*sv* and a conductive shielding 603 with a first portion 611 disposed above Rx electrode vias 202*v* and a second portion 612 disposed outside the Rx electrodes vias 202*v*. Typically, via size (with respect to diameter) corresponds to the thickness of the material that the via extends through, with larger via diameters being used to go through thicker layers. In the capacitive sensor of FIGS. 6A-6B, the via routing to the upper electrode layer (L1) (where Rx electrodes 202 are located) is broken into separate stages. From the lower electrode layer (L2) (where Tx electrode 201 are located) to the bottom of the capacitive sensor, larger size Rx electrode vias 202*v* (with Rx electrode via pads 202*p*) are used. From the upper electrode layer (L1) to the lower electrode layer (L2), smaller-sized Rx electrode step-vias 202*sv* (with Rx electrode step-via pads 202*sp*) are used.

As can be seen from FIGS. 6A-6B, this allows conductive shielding 603, which includes a first portion 611 (horizontal) disposed above the Rx electrode vias 202v and via pads 202p, and a second portion 612 (vertical) disposed outside the Rx electrode vias 202v, to be applied. Further, because step-vias 202sv can be relatively small (since they only need to traverse the distance from upper electrode layer L1 to lower electrode layer L2, which may be in the range of 1 μm to 10 μm), dummy step-vias 202d that match the conductive patterns of the alternating Rx electrodes 202 can be used so that the unshielded portions at the left and right edges of the sensing area are uniform (i.e., every Rx electrode 202 has a same-sized step-via (either a step-via 202sp or a dummy-via 202d) at the unshielded edge as shown in FIG. 6A). Accordingly, each Rx electrode 202 may have a step-via 202sv connecting it to an Rx electrode via 202v on one side, and a dummy step-via 202d (which is not terminated in a Rx electrode via) on the other side.

In a further exemplary embodiment, the conductive shielding 603 may further include a third portion 613 that extends horizontally from the second portion 612 away from the Rx electrode vias 202v. It will be appreciated that in other exemplary implementations, this horizontally extended third portion 613 may be positioned at different elevations and/or positions.

It will be appreciated that, the conductive shielding 603 may have a structure similar to the structure of conductive shielding 203 discussed above with respect to FIG. 4 (e.g., comprised of a conductive wall(s) and sheet(s), comprised of conductive vias and traces, formed as a metal bezel or conductive ink, etc.), and may be formed in a similar manner (e.g., by plating, sputtering, conductive coating, painting, and/or using an adhesive).

In a further exemplary embodiment, to further mitigate or eliminate edge effects, one or more Tx electrodes at the edge of the sensing area (e.g., one, two or three Tx electrodes 201) may be replaced with "dummy" or grounded Tx lines 201d as shown in FIGS. 6A-6B.

Figure 7:
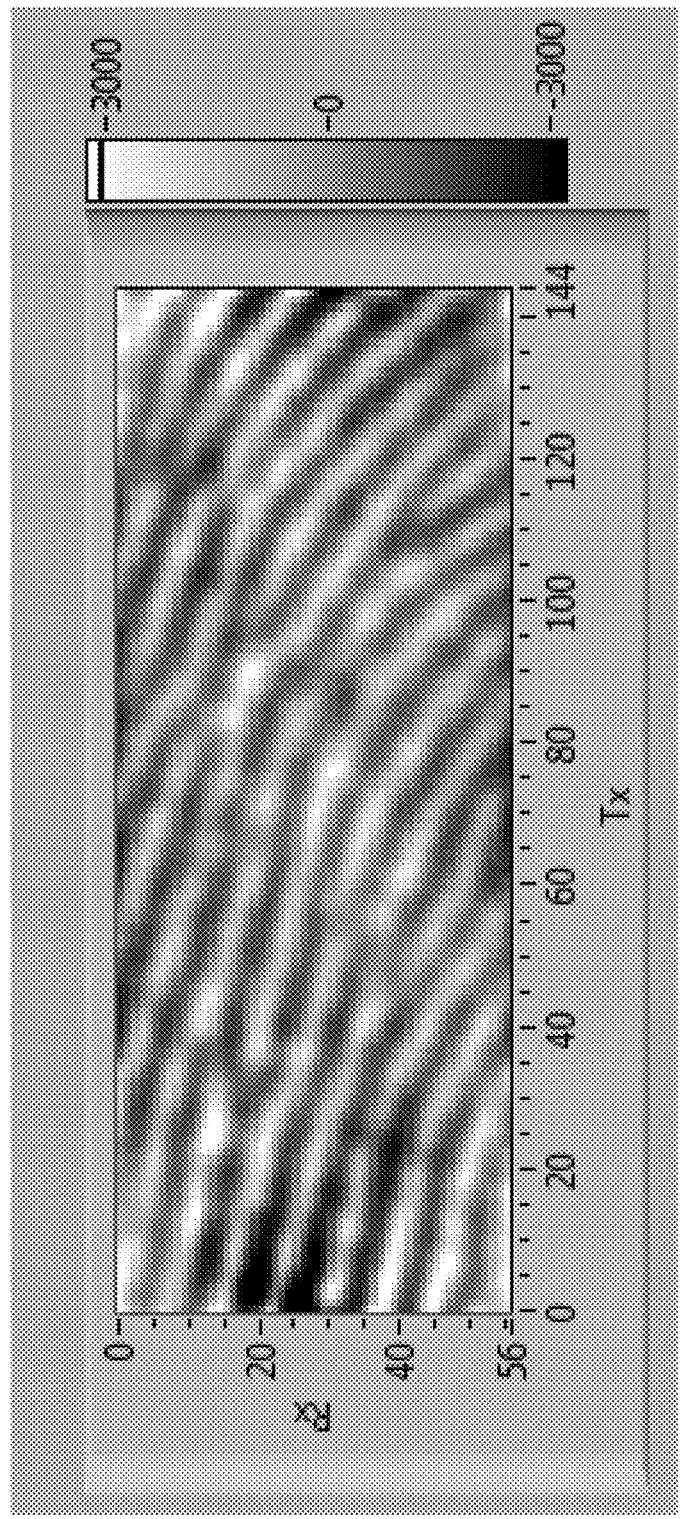
FIG. 7 depicts an example captured image of a fingerprint where edge effects along all edges are mitigated by the structures shown in FIGS. 4 and 6A-6B.

The step-via structures and conductive shielding 603 as depicted in FIGS. 6A-6B may be applied all along the left and right edges of the capacitive sensor device shown in FIG. 2A, so as to mitigate the edge effects due to the differences between alternating Rx electrodes along those left and right edges. FIG. 7 depicts an example captured image of a fingerprint where edge effects along all edges are mitigated by the structures shown in FIGS. 4 and 6A-6B, with the edge effects along the top and bottom edges being mitigated by the conductive shielding structure shown in FIG. 4 and the edge effects along the left and right edges being mitigated by the step-via structures and conductive shielding structure shown in FIGS. 6A-6B. In this particular example, which corresponds to a fingerprint sensor having a cover layer with 250 μm of glass and 21 μm of adhesive, it can be seen that edge effects along all four edges of the sensing area are mitigated or completely removed (see FIG. 3 for comparison).

In an alternative exemplary embodiment to the second exemplary embodiment, "dummy" or "balancing" metal may be used at the ends of Rx electrodes where Rx electrode vias are not present. For example, an input device for capacitive sensing according to this alternative exemplary embodiment may include: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; a first plurality of receiver electrode vias disposed on a first side of the plurality of receiver electrodes, wherein the first plurality of receiver electrode vias correspond to a first subset of the plurality of receiver electrodes; a second plurality of receiver electrode vias disposed on a second side of the plurality of receiver electrodes, wherein the second plurality of receiver electrode vias correspond to a second subset of the plurality of receiver electrodes; balancing metal corresponding to the first subset of the plurality of receiver electrodes disposed on the second side of the plurality of receiver electrodes; and balancing metal corresponding to the second subset of the plurality of receiver electrodes disposed on the first side of the plurality of receiver electrodes; wherein the balancing metal corresponding to the first subset of the plurality of receiver electrodes is configured to balance the detected signals received on the plurality of receiver electrodes proximate to the second side of the plurality of receiver electrodes; and wherein the balancing metal corresponding to the second subset of the plurality of receiver electrodes is configured to balance the detected signals received on the plurality of receiver electrodes proximate to the first side of the plurality of receiver electrodes.

Figure 8:
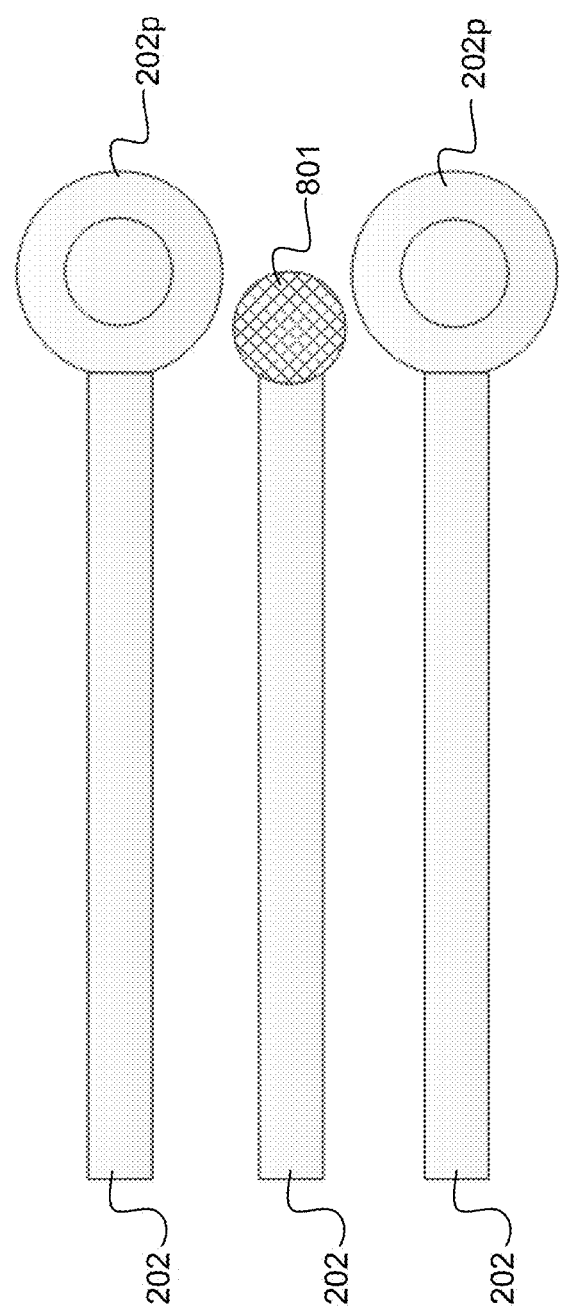
FIG. 8 is a schematic illustration of components of an example capacitive sensor having balancing metal at an end of an Rx electrode that is not connected to an Rx electrode via.

FIG. 8 is a schematic illustration of components of an example capacitive sensor having balancing metal at an end of an Rx electrode that is not connected to an Rx electrode via, in accordance with this alternative exemplary embodiment. The shape and size of the balancing metal 801, which may or may not extend into the page similar to the Rx electrode vias (connected to Rx electrode via pads 202p), is optimized based on dimensions of the Rx electrode vias and Rx electrode via pads 202p to provide a uniform electric field in the absence of an input object at edges of a sensing area proximate to the locations of Rx electrode vias are located (e.g., left and right edges of the sensing area shown in FIG. 2A). This optimization of the shape and size of the balancing metal 801 may be based on simulations using the dimensions of Rx electrode vias and Rx electrode via pads and/or the pattern or configuration in which the Rx electrodes, Rx electrode vias, and/or Rx electrode via pads are arranged. Each Rx electrode 202 may thus be connected to an Rx electrode via pad 202p on one side, and to balancing metal 801 on the other side.

In yet another exemplary embodiment alternative to the second exemplary embodiment, a grounded metal ring is provided around a sensing area formed by the Tx and Rx electrodes of a capacitive sensor, along with a plurality of traces connecting the grounded metal ring (i.e., a metal ring connected to a reference voltage or system ground) to a conductive shielding, to further mitigate potential edge effects. The grounded metal ring may be used in combination with features from other exemplary embodiments discussed herein (such as the conductive shielding depicted in FIG. 4, the step-vias and conductive shielding depicted in FIGS. 6A-6B, and the balancing metal structure depicted in FIG. 8).

Figure 9A:
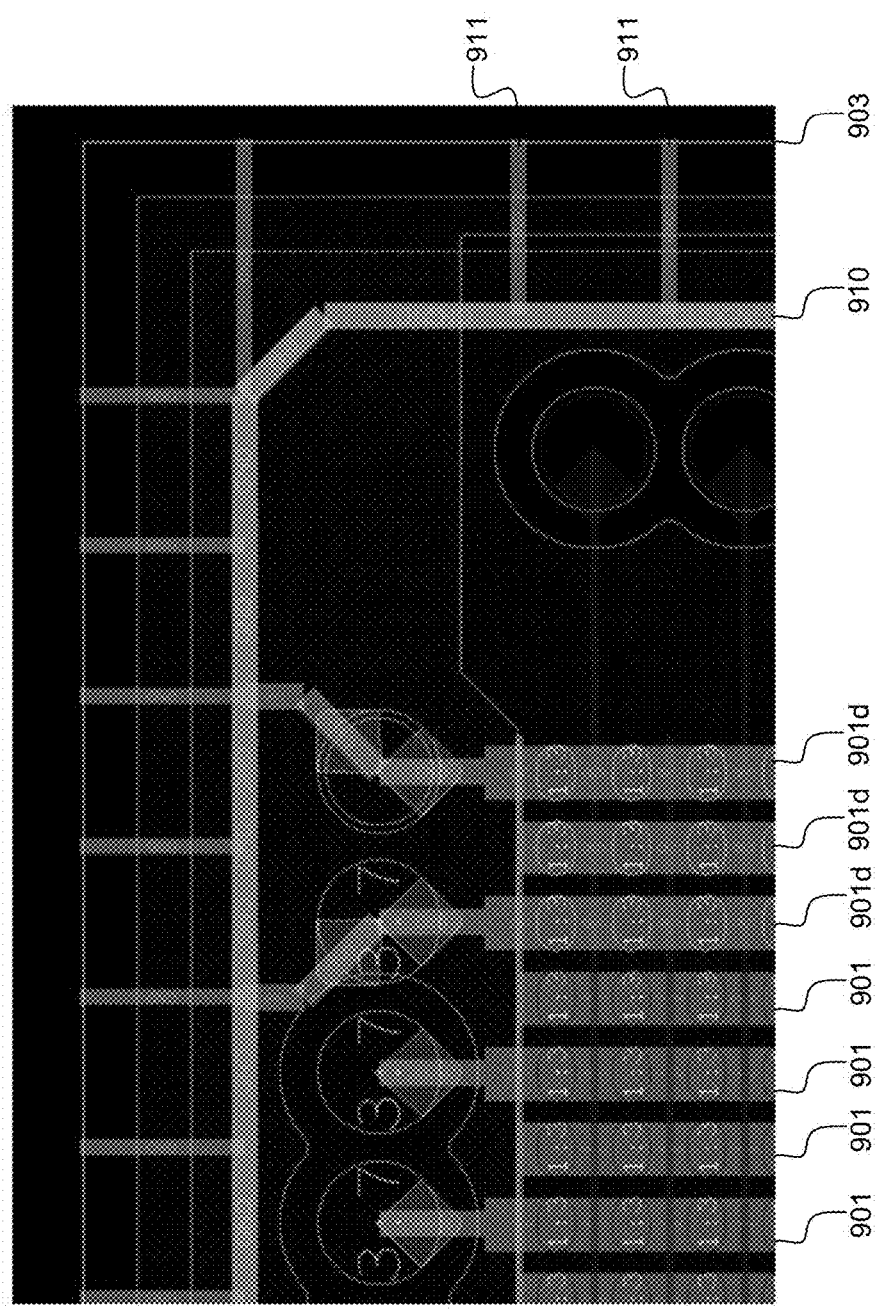
FIG. 9A-9B are schematic illustrations of components of a capacitive sensor having a grounded metal ring around a sensing area with traces connecting the grounded metal ring to a conductive shielding.
Figure 9B:
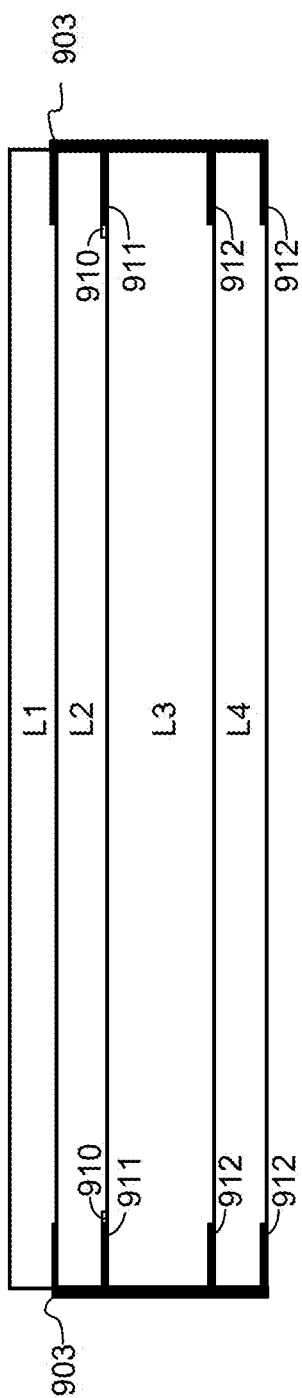

FIG. 9A-9B are schematic illustrations of components of a capacitive sensor having a grounded metal ring 910 around a sensing area with traces 911 connecting the grounded metal ring to a conductive shielding 903. FIG. 9A depicts a horizontal cross-section of the capacitive sensor in the plane of Tx electrodes 901 and "dummy" or grounded Tx electrodes 901d (which are connected to the grounded metal ring 910 via traces). The grounded metal ring 910 is connected to the conductive shielding 903 (which may have a configuration similar to the conductive shielding depicted in FIG. 4 and/or FIGS. 6A-6B).

FIG. 9B depicts a vertical cross-section of the capacitive sensor showing exemplary layers L1-L4 of the capacitive sensor. Each layer may include, for example, a dielectric portion and a metal portion, with the Rx electrodes being formed in L1, the Tx electrodes being formed in L2, the sensor core and routing provided in L3 (along with ground shielding that shields the sensor array from a sensor die mounted at the bottom of the sensor package), and additional routing and external connections being provided in L4. It will be appreciated that the depicted layers L1-L4 is merely one example, and in other exemplary embodiments, a capacitive sensor may include more or less inner layers with other configurations of sensor components.

In the example depicted in FIG. 9A, the grounded metal ring 910 is disposed in L2 around the sensing area and in plane with the Tx electrodes, with traces 911 extending from the conductive shielding 903 to the grounded metal ring 910 (see also FIG. 9B). Additional traces 912 are provided in L3 and/or L4, which connect the conductive shielding 903 to ground elements in L3 and/or L4 (such as the ground shielding mentioned above with respect to L3) so as to provide the grounding for the conductive shielding 903, the grounded metal ring 910, and/or the Tx electrodes 901*d*.

As shown in FIG. 9A, multiple redundant traces 911 may be provided in L2 to ensure that a connection between the grounded metal ring 910 and the grounded conductive shielding 903 is achieved. Similarly, multiple redundant traces 912 may be provided in L3 and/or L4 connecting the grounded conductive shielding 903 to the ground planes in L3 and/or L4.

By connecting to the conductive shielding 903 to a reference voltage or system ground by using traces as shown in FIGS. 9A-9B and providing grounded metal ring 910 around the sensing area, the components of the capacitive sensor are better protected from electrostatic discharge (ESD).

Although the exemplary embodiments discussed herein have primarily been with respect to a capacitive sensor having Tx electrodes in a lower electrode layer routed alternately on opposing sides and Rx electrode in an upper electrode layer routed alternately on opposing sides, it will be appreciated that the structures for mitigating edge effects discussed herein may also be applied with respect to capacitive sensors having other sensor electrode configurations. For example, the exemplary embodiments discussed herein may also be applied in a capacitive sensor where the Tx electrodes and Rx electrodes are reversed, with the Tx electrodes being in the upper layer (closer to the input surface) and the Rx electrodes being in the lower layer. In another example, the exemplary embodiments discussed herein may also be applied in a capacitive sensor where the Tx electrodes and the Rx electrodes are both located in an upper layer with Tx routing implemented in a lower electrode layer. In yet another example, the exemplary embodiments discussed herein may also be applied in a capacitive sensor where, unlike FIG. 2A where the Rx electrode vias on each side are arranged in a respective column and the Tx electrode vias on each side are arranged in a respective row, the Rx electrode vias on each side and Tx electrode vias are arranged in a staggered configuration such that there are two or more rows of vias on each side of the sensing area. In yet another example, the exemplary embodiments discussed herein may also be applied in a capacitive sensor where the Tx electrodes and Rx electrodes are arranged in a diamond pattern or some other pattern. It will thus be appreciated that many different patterns may be used to implement capacitive sensors with edge-effect mitigation being provided by the principles discussed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device for capacitive sensing, comprising:
  a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes;
  a plurality of transmitter electrode vias, wherein each transmitter electrode via corresponds to a respective transmitter electrode of the plurality of transmitter electrodes; and conductive shielding, configured to mitigate effects of the plurality of transmitter electrode vias on the detected signals received on one or more receiver electrodes of the plurality of receiver electrodes, wherein the conductive shielding comprises:
  a first portion disposed above the plurality of transmitter electrode vias;
  a second portion disposed outside the plurality of transmitter electrode vias; and
  a third portion extending horizontally from the second portion away from the plurality of transmitter electrode vias;
  wherein the first portion and the third portion are parallel, and/or wherein the second portion and the third portion are orthogonal.

2. The input device according to claim 1, wherein the second portion of the conductive shielding comprises a conductive wall outside a sensing area formed by the plurality of sensor electrodes.

3. The input device according to claim 1, wherein the second portion of the conductive shielding comprises a plurality of conductive vias disposed outside the plurality of transmitter electrode vias.

4. The input device according to claim 1, wherein the second portion of the conductive shielding comprises a metal bezel surrounding a sensing area formed by the plurality of sensor electrodes.

5. The input device according to claim 1, wherein the second portion of the conductive shielding comprises conductive ink.

6. The input device according to claim 1, further comprising:
  a grounded metal ring disposed around a sensing area formed by the plurality of sensor electrodes; and
  a plurality of traces connecting the grounded metal ring to the second portion of the conductive shielding.

7. The input device according to claim 6, further comprising:
  additional traces connecting the second portion of the conductive shielding to grounded elements on layers of the input device other than a layer in which the grounded metal ring is disposed.

8. The input device according to claim 1, further comprising:
  a first plurality of receiver electrode vias disposed on a first side of the plurality of receiver electrodes, wherein the first plurality of receiver electrode vias correspond to a first subset of the plurality of receiver electrodes;
  a second plurality of receiver electrode vias disposed on a second side of the plurality of receiver electrodes, wherein the second plurality of receiver electrode vias correspond to a second subset of the plurality of receiver electrodes;
  balancing metal corresponding to the first subset of the plurality of receiver electrodes disposed on the second side of the plurality of receiver electrodes; and
  balancing metal corresponding to the second subset of the plurality of receiver electrodes disposed on the first side of the plurality of receiver electrodes;
  wherein the balancing metal corresponding to the first subset of the plurality of receiver electrodes is configured to balance the detected signals received on the plurality of receiver electrodes proximate to the second side of the plurality of receiver electrodes; and
  wherein the balancing metal corresponding to the second subset of the plurality of receiver electrodes is configured to balance the detected signals received on the plurality of receiver electrodes proximate to the first side of the plurality of receiver electrodes.

9. The input device according to claim 1, further comprising:
  a plurality of receiver electrode vias, wherein each receiver electrode via of the plurality of receiver electrode vias corresponds to a respective receiver electrode of the plurality of receiver electrodes;
  a plurality of receiver electrode step-vias, wherein each receiver electrode step-via of the plurality of receiver electrode step-vias is configured to connect a receiver electrode of the plurality of receiver electrodes to a lower level of the input device; and
  additional conductive shielding, configured to mitigate effects of the plurality of receiver electrode vias on the detected signals received on one or more receiver electrodes of the plurality of receiver electrodes, wherein the additional conductive shielding comprises:
    a first portion disposed above the plurality of receiver electrode vias; and
    a second portion disposed outside the plurality of receiver electrode vias.

10. An input device for capacitive sensing, comprising:
  a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes;
  a first plurality of receiver electrode vias disposed on a first side of the plurality of receiver electrodes, wherein the first plurality of receiver electrode vias correspond to a first subset of the plurality of receiver electrodes;
  a second plurality of receiver electrode vias disposed on a second side of the plurality of receiver electrodes, wherein the second plurality of receiver electrode vias correspond to a second subset of the plurality of receiver electrodes;
  balancing metal corresponding to the first subset of the plurality of receiver electrodes disposed on the second side of the plurality of receiver electrodes; and
  balancing metal corresponding to the second subset of the plurality of receiver electrodes disposed on the first side of the plurality of receiver electrodes;
  wherein the balancing metal corresponding to the first subset of the plurality of receiver electrodes is configured to balance the detected signals received on the plurality of receiver electrodes proximate to the second side of the plurality of receiver electrodes so as to mitigate the appearance of edge effects on a second side of a detected image corresponding to the second side of the plurality of receiver electrodes; and
  wherein the balancing metal corresponding to the second subset of the plurality of receiver electrodes is configured to balance the detected signals received on the plurality of receiver electrodes proximate to the first side of the plurality of receiver electrodes so as to mitigate the appearance of edge effects on a first side of the detected image corresponding to the first side of the plurality of receiver electrodes.

11. The input device according to claim 10, further comprising:

a plurality of transmitter electrode vias, wherein each transmitter electrode via corresponds to a respective transmitter electrode of the plurality of transmitter electrodes; and conductive shielding, configured to mitigate effects of the plurality of transmitter electrode vias on the detected signals received on one or more receiver electrodes of the plurality of receiver electrodes, wherein the conductive shielding comprises:

a first portion disposed above the plurality of transmitter electrode vias; and a second portion disposed outside the plurality of transmitter electrode vias.

12. An input device for capacitive sensing, comprising:

a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes;

a plurality of receiver electrode vias and a plurality of receiver electrode step-vias, wherein each receiver electrode step-via of the plurality of receiver electrode step-vias is configured to connect a respective receiver electrode of the plurality of receiver electrodes to a lower level of the input device, and wherein a respective receiver electrode via corresponding to the respective receiver electrode is also connected to the lower level of the input device and is connected to the respective receiver electrode through the respective receiver electrode step-via; and conductive shielding, configured to mitigate effects of the plurality of receiver electrode vias on the detected signals received on one or more receiver electrodes of the plurality of receiver electrodes, wherein the conductive shielding comprises:

a first portion disposed above the plurality of receiver electrode vias; and a second portion disposed outside the plurality of receiver electrode vias;

wherein the first portion of the conductive shielding disposed above the plurality of receiver electrode vias is disposed in a same layer of the input device as the plurality of receiver electrodes.

13. The input device according to claim 12, wherein each receiver electrode of the plurality of receiver electrodes comprises a first receiver electrode step-via on a first side and a second receiver electrode step-via on a second side.

14. The input device according to claim 13, wherein the first receiver electrode step-via is connected to a receiver electrode via of the plurality of receiver electrode vias, and wherein the second receiver electrode step-via is floating.

15. The input device according to claim 12, further comprising:

one or more grounded transmitter electrodes proximate to an edge of a sensing area formed by the plurality of sensor electrodes.

16. The input device according to claim 12, wherein the plurality of receiver electrode vias comprise receiver electrode vias in a staggered configuration.

17. The input device according to claim 12, further comprising:

a grounded metal ring disposed around a sensing area formed by the plurality of sensor electrodes; and a plurality of traces connecting the grounded metal ring to the second portion of the conductive shielding.

18. The input device according to claim 12, further comprising:

a plurality of transmitter electrode vias, wherein each transmitter electrode via corresponds to a respective transmitter electrode of the plurality of transmitter electrodes; and additional conductive shielding, configured to mitigate effects of the plurality of transmitter electrode vias on the detected signals received on one or more receiver electrodes of the plurality of receiver electrodes, wherein the additional conductive shielding comprises:

a first portion disposed above the plurality of transmitter electrode vias; and a second portion disposed outside the plurality of transmitter electrode vias.

* * * * *